United States Patent [19]
Marley

[11] 4,106,336
[45] Aug. 15, 1978

[54] FULL-SEASON RAIN GAUGE HAVING REPLACEABLE CHARTS FOR MAKING PROFILE GRAPHS

[76] Inventor: Clement F. Marley, P.O. Box 93, Nokomis, Ill. 62075

[21] Appl. No.: 740,761

[22] Filed: Nov. 10, 1976

[51] Int. Cl.² .................................................. G01W 1/14
[52] U.S. Cl. ....................................................... 73/171
[58] Field of Search .......................................... 73/171

[56] References Cited
U.S. PATENT DOCUMENTS

| 1,153,355 | 9/1915 | Tredway | 73/171 |
| 2,381,602 | 8/1945 | Larson | 73/171 |
| 2,509,522 | 5/1950 | Phillips | 73/171 |

FOREIGN PATENT DOCUMENTS 553,745  6/1932  Fed. Rep. of Germany ............. 73/171

Primary Examiner—Anthony V. Ciarlante
Attorney, Agent, or Firm—Ralph F. Staubly

[57] ABSTRACT

A full-season rain gauge for outdoor or partial outdoor installation comprises basically a weather-resistant vertically elongated panel, a season-height freeze-proof plastic tube fixed thereto, a shorter single-rain short-time-period plastic rain-gauge tube detachably mounted on the upper end of the season-height tube, and a one-season weather-resistant chart removably and replaceably positioned beside said tubes for recording thereon accumulated dated rainfall amounts and for subsequent side-by-side positioning to provide a successive-seasons profile graph. The shorter tube is removable after each rainfall or e.g. at weekly intervals. Its contents are then poured into the season-height tube, and the water height therein is marked and dated on the chart. The rain collector can be mounted at an elevated outdoor location and can be connected indoors to the rain gauge proper by a small flexible hose.

6 Claims, 5 Drawing Figures

FULL-SEASON RAIN GAUGE HAVING REPLACEABLE CHARTS FOR MAKING PROFILE GRAPHS

BACKGROUND AND OBJECTS OF THE INVENTION

Full-season rain gauges (e.g. Tredway U.S. Pat. No. 1,153,355) and rain gauges having charts attached thereto (e.g. Hunn et al U.S. Pat. No. 2,507,206) are broadly old. But no known full-season rain gauge combines simple and low-cost construction with replaceable recording charts which are located beside the gauge and co-extensive therewith and which can subsequently be assembled side-by-side to provide a many-seasons rainfall profile graph.

It is accordingly the principal object of this invention to provide a simple and low-cost rain gauge having replaceable recording charts that can later be assembled beside the gauge or elsewhere to produce a many-seasons profile graph.

It is another object to provide such a gauge having a single-rain (or short-time-period) auxiliary gauge mounted on the top of the season-length gauge and easily removable for pouring its contents into the season-length gauge.

It is a further object to provide such a gauge which is capable of either fully outdoor or partially indoor installation.

Other objects and advantages will become apparent as the following detailed description proceeds.

Figure 1:
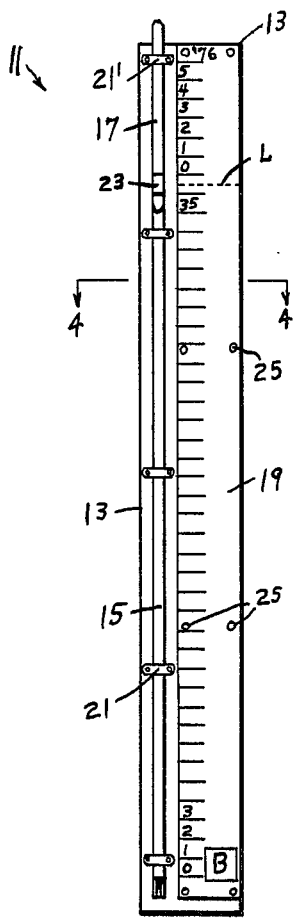
FIG. 1 is a front elevational view of the rain gauge proper.

With reference now to the drawings, the numeral 11 generally designates the preferred embodiment of the invention. The rain gauge 11 comprises basically a vertically elongated support panel 13, a season-height transparent tube 15, a single-rain or short-time-period transparent tube 17, and a removable and replaceable chart strip 19. The support panel can be made of a plastic material, or of wood or hard-board treated to be weather-proof or weather-resistant.

The season-length tube 15 (e.g. 30 to 60 inches) is preferably made of a sufficiently elastic plastic material to be freeze-proof. It is permanently fastened to the panel 13 by nail or screw-attached omega-shaped straps 21. The single-rain-length gauge tube 17 (e.g. 5 to 10 inches) is of like material, but is removably loosely held in place by the uppermost strap 21' and by a sealing plug 23 (FIG. 3) which is cemented therein and protrudes therefrom to fit removably into the upper end of the season-length tube 15. The upper end of the tube 17 is tapered, as shown, to provide a rain-drop-splitting sharp edge 17e for accurate gauging and to provide a sharp lip for no-spill pouring of rain water from tube 17 into tube 15.

The removable and replaceable chart strips 19 are preferably made of water-proofed paper or plastic sheet-material. They are shown as attached to the panel 13 by thumb tacks 25 but alternatively could have pressure-adhesive-coated back surfaces. They desirably have cut or tear lines L for use, if necessary, to align the zero lines of the upper and lower chart portions with the zero water-level lines of the two tubes. B is a printed instruction block.

Figure 2:
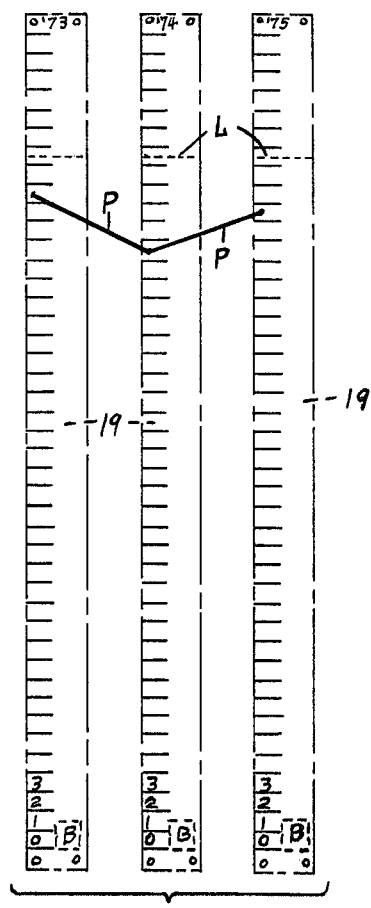
FIG. 2 is a front elevational view of assembled charts arranged to provide a rainfall profile graph.

In FIG. 2 the chart strips 19 are shown as mounted side-by-side for the years 1973 through 1975 so that a graph profile line P can be drawn through the points representing the total rainfall for each season monitored.

Figure 3:
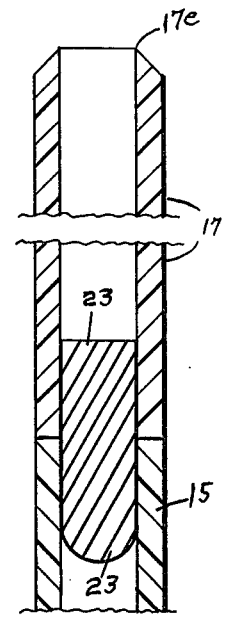
FIG. 3 is an enlarged elevational view of the upper fourth of the assembled gauge tubes of FIG. 1 in vertical axial section.
Figure 4:
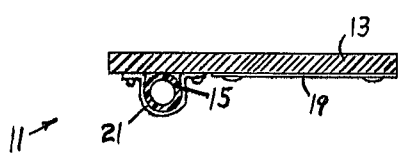
FIG. 4 is an enlarged plan view of the disclosure of FIG. 1 in section on the line 4—4 of FIG. 1.
Figure 5:
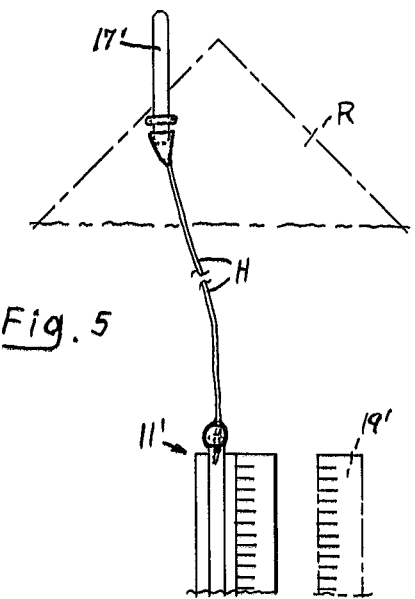
FIG. 5 is a fragmentary elevational view of an outdoor-indoor installation.

FIG. 5 shows a rain collector element 17' mounted above a building roof R and connected by a small flexible hose H to a rain gauge 11' which is the gauge of FIGS. 1, 3 and 4 located within the same or another building (not shown).

The invention having been described, what is claimed as new and patentable is:

1. A rain gauge comprising: a support panel, a vertically disposed translucent season-height gauge tube mounted on said panel, a shorter translucent gauge tube attached co-axially above to said season-height tube, the interconnection between said tubes being constructed and arranged to facilitate discharge of rain water from said shorter tube into said season-height tube, and a calibrated record chart removably and replaceably mounted laterally adjacent said tubes and adapted for subsequent juxtapositioning with similar charts for providing a seasonal rain-profile graph.

2. Structure according to claim 1, the interconnection means between said tubes being a bottom plug sealing said shorter tube and positioningly extending into the top of said season-height tube.

3. Structure according to claim 1, said tubes being formed of a semi-rigid plastic material which is sufficiently elastic to be freeze-proof.

4. Structure according to claim 1, said shorter tube having its upper lip beveled to provide a rain-drop-splitting sharp edge for increasing accuracy and also to minimize during pouring therefrom.

5. Structure according to claim 1 and additionally including a second shorter tube adapted for elevated outdoor mounting, and means including a small flexible hose connecting said second shorter tube dischargingly into said first-mentioned shorter tube, whereby said rain gauge proper can be located in a sheltered environment.

6. Structure according to claim 1, said record-keeping chart being divided into a short upper portion for recording short-period rainfall indicated in the shorter gauge tube and a taller lower portion for recording accumulated seasonal rainfalls as indicated in the season-height gauge tube.

* * * * *